(12) United States Patent
Yang et al.

(10) Patent No.: US 12,479,544 B2
(45) Date of Patent: Nov. 25, 2025

(54) UNMANNED SURVEY VESSEL WITH ANTI-OVERTURNING STRUCTURE AND ANTI-OVERTURNING METHOD OF SAME

(71) Applicant: North China University of Science and Technology, Tangshan (CN)

(72) Inventors: Jiudong Yang, Tangshan (CN); Fenghua Wu, Tangshan (CN); Muyao Shi, Tangshan (CN); Lingyun Zhang, Tangshan (CN); Liwen Yin, Tangshan (CN); Gui'e Tian, Tangshan (CN); Jinliang Hou, Tangshan (CN); Lipeng Gong, Tangshan (CN)

(73) Assignee: North China University of Science and Technology, Tangshan (CN)

( * ) Notice: Subject to any disclaimer, the term of this patent is extended or adjusted under 35 U.S.C. 154(b) by 409 days.

(21) Appl. No.: 18/214,222

(22) Filed: Jun. 26, 2023

(65) Prior Publication Data
US 2024/0116606 A1    Apr. 11, 2024

(30) Foreign Application Priority Data
Oct. 11, 2022    (CN) .......................... 202211240733.3

(51) Int. Cl.
*B63B 43/14*    (2006.01)
*B63B 35/00*    (2020.01)

(52) U.S. Cl.
CPC .............. *B63B 43/14* (2013.01); *B63B 35/00* (2013.01); *B63B 2035/006* (2013.01)

(58) Field of Classification Search
CPC ......... B63B 43/00; B63B 43/02; B63B 43/10; B63B 43/14; B63B 2043/145; B63B 35/00; B63B 2035/006; B63B 1/32; B63B 3/14
USPC .................................. 114/68, 121, 122, 124
See application file for complete search history.

(56) References Cited

U.S. PATENT DOCUMENTS

| | | | | |
|---|---|---|---|---|
| 10,005,523 | B2 * | 6/2018 | Dudley | B63H 25/04 |
| 10,281,602 | B2 * | 5/2019 | Moldoveanu | G01V 1/3852 |
| 10,479,455 | B2 * | 11/2019 | Toennessen | G05D 1/0027 |
| 10,518,847 | B2 * | 12/2019 | Dudley | G01V 1/3808 |
| 10,809,403 | B2 * | 10/2020 | Moldoveanu | B63B 35/00 |

FOREIGN PATENT DOCUMENTS

CN    210478972 U    5/2020

* cited by examiner

*Primary Examiner* — Daniel V Venne
(74) *Attorney, Agent, or Firm* — Suiter Swantz IP (57) ABSTRACT

This disclosure provides an unmanned survey vessel with an anti-overturning structure and an anti-overturning method. The unmanned survey vessel includes a vessel body and a plurality of buoys. The vessel body is a hollow frame of which a middle is provided with a discharge space. An upright rod is vertically fixed at an upper-end of the tail part of the vessel body. A supporting beam is horizontally fixed at an upper-end of the upright rod. The supporting beam extends to a bow of the vessel. A rectangular notch is formed in one end, close to the bow, of the supporting beam. One end close to the bow inside the rectangular notch is rotatably provided with a guide rod through a pin shaft. The plurality of buoys are equally divided into two groups which are adjustably arranged on two side walls in the advancing direction of the vessel body respectively.

10 Claims, 7 Drawing Sheets

UNMANNED SURVEY VESSEL WITH ANTI-OVERTURNING STRUCTURE AND ANTI-OVERTURNING METHOD OF SAME

CROSS-REFERENCE TO RELATED APPLICATION

This application claims priority to Chinese Patent Application No. 202211240733.3, filed on Oct. 11, 2022, which is hereby incorporated by reference in its entirety.

TECHNICAL FIELD

The present disclosure relates to the anti-overturning technique field of unmanned survey vessels, in particular to an unmanned survey vessel with an anti-overturning structure and an anti-overturning method of same.

BACKGROUND

The unmanned survey vessel is equipment for carrying out survey operations in specific water areas instead of large-scale survey vessels and workforce, which meets the daily requirement of detecting water bodies. The patent with the application number CN201921144461.0 discloses a collision-resistant vessel body structure of an unmanned survey vessel. The unmanned survey vessel can be prevented from colliding and overturning, but the traditional unmanned survey vessel cannot achieve wave resistance and overturning resistance due to different complex conditions in different water areas. When the vessel body encounters strong winds and waves, the vessel body is prone to be overturned causing a measuring assembly on the unmanned survey vessel is subjected to immersion in water, resulting in circuit failures of a measuring instrument and influence on normal navigation of the unmanned survey vessel and normal use of the measuring instrument. Therefore, an unmanned survey vessel with an anti-overturning structure and an anti-overturning method of same are designed so as to facilitate to solve the problems.

SUMMARY

The purpose of the present disclosure is to provide an unmanned survey vessel with an anti-overturning structure and an anti-overturning method of same so as to solve the problems proposed in the above background.

In order to achieve the above purpose, the present disclosure provides the following technical scheme. An unmanned survey vessel with an anti-overturning structure includes a vessel body and a plurality of buoys. A tail part of the vessel body is provided with a powered propeller for advancing the vessel body. The power propeller rotates to ensure the normal running of the vessel body on the water surface.

The survey body is a hollow frame in which a middle is provided with a discharge space. When the vessel body encounters strong winds and waves, the waves hit the vessel body and then fall into the discharge space, and an impact surface with the vessel body is lowered, so that the wave resistance and overturning resistance are enhanced.

A bottom of the bow of the vessel body is provided with a baffle plate distributed in the V-shaped structure. The baffle plate is obliquely distributed towards a lower part of one side of the vessel body in a direction of the tail part. During the advancing process of the vessel body, the baffle plate bears the impact of an advancing process of the water flow and diverts water along both sides of the baffle plate. The baffle plate can play a role in lifting the bow of the vessel body upward during the advancing process. On the one hand, standard advancement of the vessel body is ensured, and on the other hand, the vessel body is prevented from being overturned by an unstable center of gravity.

An upright rod is vertically fixed at the upper end of the tail part of the vessel body. A supporting beam is horizontally fixed at the upper end of the upright rod. The supporting beam extends to the bow of the vessel body. A rectangular notch is formed at one end, close to the bow, of the supporting beam. One end in the rectangular notch close to the bow is rotatably provided with a guide rod through a pin shaft. The rotating part is provided with atorsion spring. The guide rod is overturned around the pin shaft with a trend of real-time vertical downward distribution utilizing the torsion potential energy of the torsion spring. The guide rod is inserted below the liquid level so that the stability of the vessel body is improved, and the vessel body is prevented from being overturned.

The plurality of buoys is equally divided into two groups which are adjustably arranged on two side walls in the advancing direction of the vessel body respectively. The buoys assist in buoying the vessel body with buoyancy.

In a further embodiment, an axial direction of the guide rod is provided with a drawing hole. A limiting rod is slidably plugged into the drawing hole. Both ends of the limiting rod respectively extend to the outer parts of two ends of the axial direction of the guide rod A storage groove for storing an end of the limiting rod is formed in a side wall of one side, away from the bow, inside the rectangular notch. The torsion spring generates torsional potential energy when the guide rod is overturned to a horizontal state around the rotating part. At the same time, the limiting rod slides along the drawing hole, and the end of the limiting rod is inserted into the storage groove, so that the guide rod is prevented from being placed stably after the vessel body is picked up.

In a further embodiment, a ball-shaped block is fixed at one end limiting rod, and a clamping seat clamped with the ball-shaped block is fixedly arranged in the storage groove.

A counterweight column is slidably plugged into the drawing hole in a further embodiment. A through the hole into which the limiting rod is slidably plugged is axially formed in the counterweight column. An outer wall of the limiting rod is fixedly sleeved with a limiting disc which is located in the drawing hole. The counterweight column is arranged in the drawing hole, so that the bottom end of the guide rod is heavy and cannot swing randomly, and the stability of the vessel body is enhanced.

In a further embodiment, an axial end of the buoy is provided with a connecting block. An adjusting rod (10) is fixedly arranged at the end of the connecting block. A toothed disc is fixed on a side wall of one end, away from the connecting block, of the adjusting rod through a connecting rod. Each of the side walls of both sides of the vessel body in the advancing direction is provided with a plurality of toothed slots. The toothed discs are meshed with the toothed slots. The adjusting rod is connected with the buoys, and the toothed discs cannot rotate in the toothed slots, so that it can be ensured that buoying positions of the buoys relative to the vessel body cannot be changed, and the toothed discs are pulled out from the toothed slots to rotate. Thus, the inclination angle of the adjusting rod can be adjusted, and the height of the buoy relative to the vessel body is adjusted.

An adjusting cavity communicating with each toothed slot (18) is arranged in the vessel body. Limiting grooves are formed on both sides of the adjusting cavity. One end, away from the connecting rod, of the toothed disc is rotatably connected with a T-shaped rod located in the adjusting cavity. Two arc-shaped elastic sheets are symmetrically fixed at one end, away from the toothed disc, of the T-shaped rod. One end of each arc-shaped elastic sheet extends into the limiting groove and is slidably attached to an inner wall of the limiting groove. When the toothed discs are pulled out from the toothed slots and are rotated to adjust the inclination angle of the adjusting rod, the T-shaped rod slides along the inside of the adjusting cavity along with the toothed discs, and the two arc-shaped elastic sheets are limited by the corresponding limiting slots. When the T-shaped rod slides, the arc-shaped elastic sheets can be completely deformed and generate potential rebound energy. After the toothed discs leave the tooth slots, the inclination angle of the adjusting rod is adjusted by rotation, and then the toothed discs are inserted into the tooth slots. The toothed discs can be stably plugged into the toothed slots by using the potential rebound energy of the arc-shaped elastic sheets.

In a further embodiment, each buoy and the connecting block are rotatably connected so that the buoy rotates when the vessel body is impacted by water flow during the advancing process, and the resistance is reduced when the buoy is in contact with water.

In a further embodiment, a drainage plate is fixed on a side wall of one side close to the bow in the discharge space of the vessel body. An upper-end surface of the drainage plate is obliquely distributed towards an upper part of one side of the vessel body (1) in the direction of the tail part. During the advancing process of the vessel body, after the water flow rushes to the upper-end surface of the vessel body, the bow of the vessel body is tilted upwards through the obstruction of the baffle plate, and the water impacting on the vessel body flows along the inclined upper-end surface of the drainage plate, so that the flowing time of the water flow is prolonged. During the flowing process, the vessel body can be weighted to prevent the bow from being tilted upwards too much to cause overturning.

In a further embodiment, a plurality of diversion plates are fixed on the side walls of both sides of the drainage plate. Side walls of both sides of each diversion plate are bent upward by 90 degrees to form a splitting channel. The water flow flows from the drainage plate's upper end surface into the diversion plate's diversion groove, and finally flows out through the diversion groove. In this process, the residence time of the water flow can be further prolonged, the bottom of the vessel body is weighted, and the stability of the vessel body is enhanced.

In a further embodiment, a guide plate with a V-shaped structure is fixedly arranged on a side wall of one side, close to the advancing direction of the bow, on an outer wall of the guide rod through a supporting block. The guide rod is vertically distributed. When the impact of the water flow is encountered, the resistance of the guide rod in the advancing process is reduced through the diversion of the V-shaped guide plate.

Preferably, an overturning method of the same with an anti-overturning structure includes the following steps:

stably buoying the vessel body with a plurality of buoys which meets daily driving requirements of the vessel body running on a water surface; lifting the supporting beam through the upright rod to prevent water waves from wetting a measuring instrument and ensure the normal use of the measuring device, and setting the vessel body as a hollow frame of which middle is provided with a discharge space, so that the water waves hit the vessel body and then fall into the discharge space when the vessel body encounters strong winds and waves, and an impact surface with the vessel body is lowered, so that a wave resistance and an overturning resistance are enhanced.

The present disclosure has the following beneficial effects compared with the prior art.

According to the unmanned survey vessel with an anti-overturning structure and the overturning method of the same, the vessel body is arranged as a hollow frame with a discharge space in the middle. When the vessel body encounters strong winds and waves, the waves hit the vessel body and then fall into the discharge space, and an impact surface with the vessel body is lowered, so that the wave resistance and overturning resistance are enhanced. In addition, it is ensured that the vessel body can stably float on the water surface by arranging the adjustable buoys, so that circuit failures caused by immersion of a measuring instrument on the vessel body and influence on normal navigation of the unmanned survey vessel and normal use of the measuring instrument are avoided.

Reference signs: 1, vessel body; 2, baffle plate; 3, drainage plate; 4, diversion plate; 5, limiting rod; 6, guide rod; 7, supporting beam; 8, upright rod; 9, buoy; 10, adjusting rod; 11, toothed disc; 12, arc-shaped elastic sheet; 13, T-shaped rod; 14, clamping seat; 15, limiting disc; 16, ball-shaped block; 17, counterweight column; 18, toothed slot; 19, adjusting cavity; 20, limiting groove; 21, guide plate; and 22, supporting block.

DETAILED DESCRIPTION OF THE EMBODIMENTS

The following clearly and completely describes the technical scheme in the embodiments of the present disclosure regarding the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Embodiments

Figure 1:
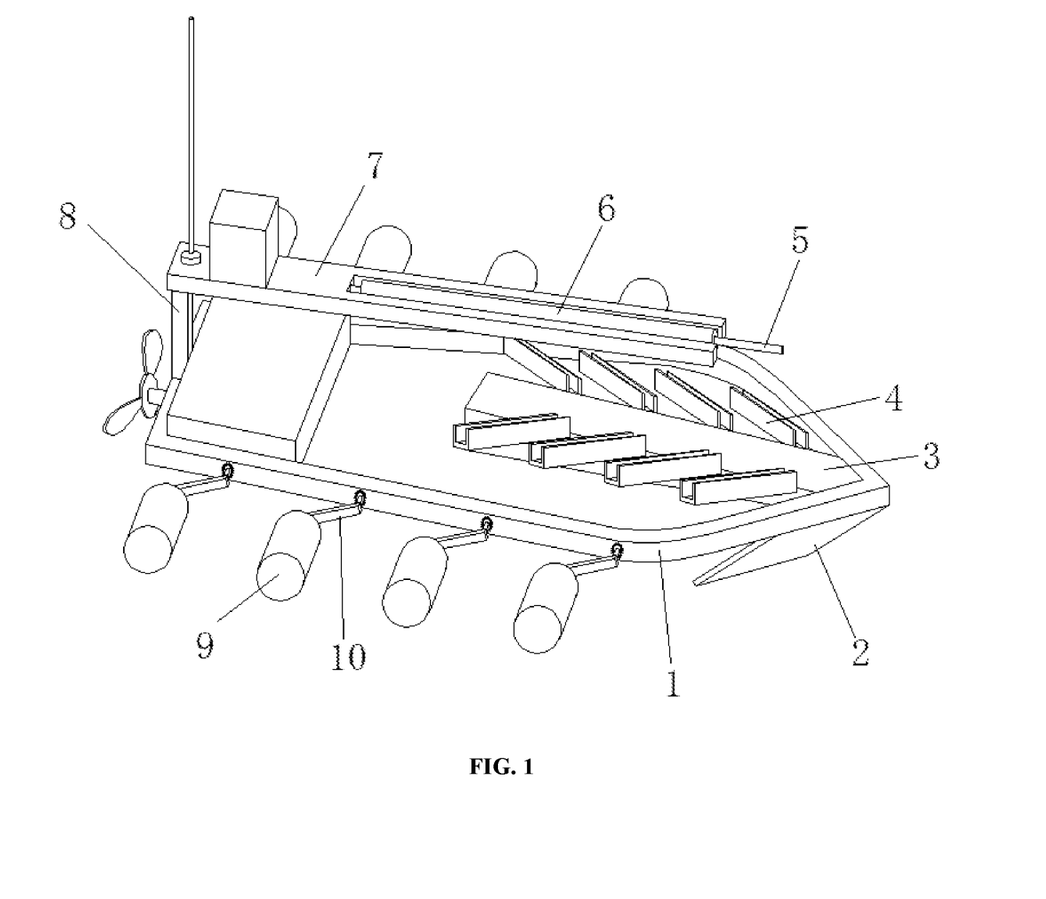
FIG. 1 is a schematic diagram of a main body structure in the present disclosure.

Referring to FIG. 1, the embodiment provides an unmanned survey vessel with an anti-overturning structure and an overturning method of the same. The unmanned survey vessel includes a vessel body 1 and a plurality of buoys 9. A tail part of the vessel body 1 is provided with a power propeller for advancing the vessel body 1. The vessel body 1 is provided with an engine providing power for the power propeller. The power propeller rotates to ensure the normal running of the vessel body on the water surface. At the same time, the engine is remotely controlled to start and stop by remote wireless control equipment, so that the normal running and stopping operation of vessel body 1 can be accurately controlled.

An upright rod 8 is vertically fixed at the upper end of the tail part of the vessel body 1. A supporting beam 7 is horizontally fixed at the upper end of the upright rod 8. The supporting beam 7 extends to the bow of vessel body 1. A wireless antenna and a measuring instrument for measuring are arranged at one end, away from the bow, of the supporting beam 7. The supporting beam 7 is lifted by the upright rod 8, so that the measuring instrument is prevented from being wet by water waves, and regular use of the measuring instrument is ensured.

The plurality of buoys 9 are equally divided into two groups which are adjustably arranged on two side walls in the advancing direction of the vessel body 1 respectively. The buoys 9 assist in buoying the vessel body 1 with buoyancy.

Figure 2:
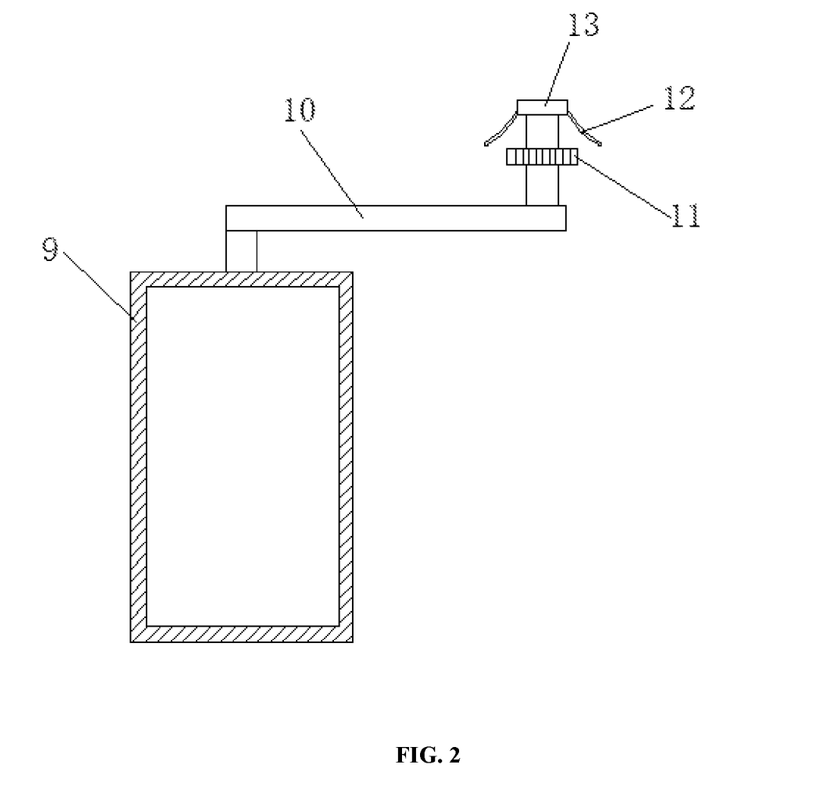
FIG. 2 is a top structural view of a buoy and an adjusting rod in the present disclosure.

Referring to FIG. 2, an axial end of the buoy 9 is provided with a connecting block. An adjusting rod 10 is fixedly arranged at one end of the connecting block. A toothed disc 11, through a connecting rod, is fixed on a side wall of one end, away from a rotating block, of the adjusting rod 10. A plurality of toothed slots 18 are formed on side walls of both sides of the vessel body 1 in the advancing direction. The toothed discs 11 are meshed into the toothed slots 18. The adjusting rod 10 is connected with the buoys 9, and the toothed discs 11 cannot rotate in the toothed slots 18, so that it can be ensured that buoying positions of the buoys 9 relative to the vessel body 1 cannot be changed, and the toothed discs 11 are pulled out from the toothed slots 18 to rotate. Thus, an inclination angle of the adjusting rod 10 can be adjusted, and the height of the buoy 9 relative to the vessel body 1 is adjusted.

Figure 5:
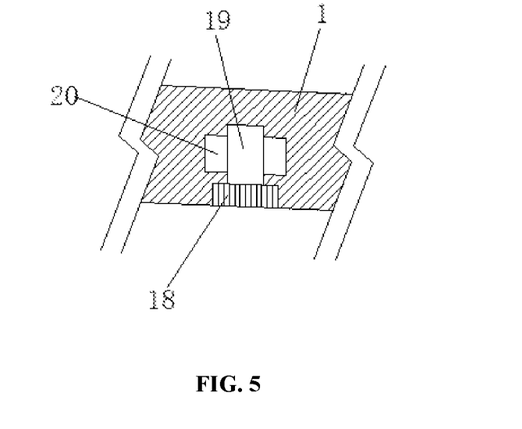
FIG. 5 is a local structural section view of a vessel body in the present disclosure.

Referring to FIG. 5, an adjusting cavity 19 communicating with the toothed slots 18 is formed in the vessel body 1. Limiting grooves 20 are formed on both sides in the adjusting cavity 19. One end, away from the connecting rod, of the toothed disc 11 is rotatably connected with a T-shaped rod 13 located in the adjusting cavity 19. Two arc-shaped elastic sheet 12 are symmetrically fixed at one end, away from the toothed disc 11, of the T-shaped rod 13. One end of the arc-shaped elastic sheet 12 extends to the inside of the limiting groove 20 and is slidably attached to an inner wall of the limiting groove 20. When the toothed discs 11 are pulled out from the toothed slots 18 and rotated to adjust the inclination angle of the adjusting rod 10, the T-shaped rod 13 slides along the inside of the adjusting cavity 19 along with the toothed discs 11, and the two arc-shaped elastic sheets 12 are limited by the corresponding limiting slots 20. When the T-shaped rod 13 slides, the arc-shaped elastic sheets 12 can be completely deformed and generate potential rebound energy. After the toothed discs 11 leave the tooth slots 18, the inclination angle of the adjusting rod 10 is adjusted by rotation, and then the toothed discs 11 are inserted into the tooth slots 18. The toothed discs 11 can be stably plugged into the toothed slots 18 by using the rebound potential energy of the arc-shaped elastic sheets 12.

The buoy 9 and the connecting block are rotatably connected, so that buoy 9 rotates when vessel body 1 is impacted by water flow during the advancing process, and the resistance is reduced when buoy 9 is in contact with water.

Specific positions of buoys 9 on both sides of vessel body 1 are adjusted. Vertical heights of the buoys 9 from an upper end surface of the vessel body 1 are adjusted. The height of the water surface can be ensured not to exceed the upper-end surface of the vessel body 1 by adjusting buoying positions of the buoys 9, so that the measuring instrument on vessel body 1 is prevented from being immersed in water to cause circuit failures and influence on normal navigation of the unmanned survey vessel and normal use of the measuring instrument.

However, simultaneously, the bottom of the vessel body 1 should be immersed in the water to prevent vessel body 1 from being supported by the plurality of buoys 9 and leaving the water surface, thus avoiding poor stability of the vessel body 1 and heavy waves. The supporting stability of the buoys 9 cannot meet stable buoying of vessel body 1 on the water surface to cause overturning.

Referring to FIG. 1, the vessel body 1 is arranged as a hollow frame of which a middle is provided with a discharge space. When the vessel body encounters strong winds and waves, the waves hit the vessel body 1 and then fall into the discharge space, and an impact surface with the vessel body 1 is lowered, so that the wave resistance and overturning resistance are enhanced.

Figure 6:
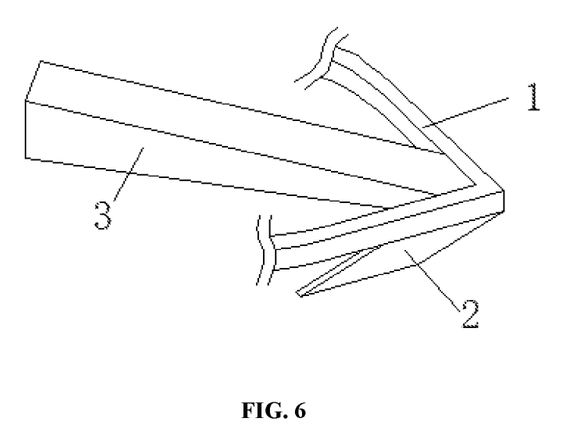
FIG. 6 is a local structural section view of a vessel body in the present disclosure.

Referring to FIG. 1 and FIG. 6, during the advancing process of the vessel body 1, the bow can scoop up the water surface and is pressed down by water, so that the vessel body 1 is tilted and immersed below the water surface to cause greater resistance in the traveling direction of the vessel body 1. A bottom of a bow of the vessel body 1 is provided with a baffle plate 2 distributed in a V-shaped structure. The baffle plate 2 is obliquely distributed towards a lower part of one side of the vessel body 1 in a direction of the tail part. During the advancing process of the vessel body 1, the baffle plate 2 bears the impact of the water flow during the advancing process and diverts water along both sides of the baffle plate 2. The baffle plate 2 can play a role in lifting the bow of the vessel body 1 upward during the advancing process. On one hand, the standard advancement of the vessel body 1 is ensured, and on the other hand, the vessel body 1 is prevented from being overturned by unstable center of gravity.

A rectangular notch is formed in one end of the supporting beam 7 close to the bow. One end in the rectangular notch close to the bow is rotatably provided with a guide rod 6 through a pin shaft. The rotating part is provided with a torsion spring. The guide rod 6 is overturned around the pin shaft with a trend of real-time vertical downward distribution using the torsion potential energy of the torsion spring, so that the guide rod 6 is in a vertical state when the vessel body 1 is stopped. The guide rod 6 is inserted below the liquid level, so that the stability of the vessel body 1 is improved, and the vessel body 1 is prevented from being overturned.

In addition, during the advancing process of the vessel body 1, the guide rod 6 can also be subjected to impact force of water, and the guide rod 6 can swing around the rotating part to the stern side, so that the damping generated during the advancing process of the vessel body 1 is reduced, but the torsion spring can generate reverse potential energy, so that reverse rotation of the guide rod 6 is facilitated, and the stability of the vessel body 1 is enhanced.

Figure 3:
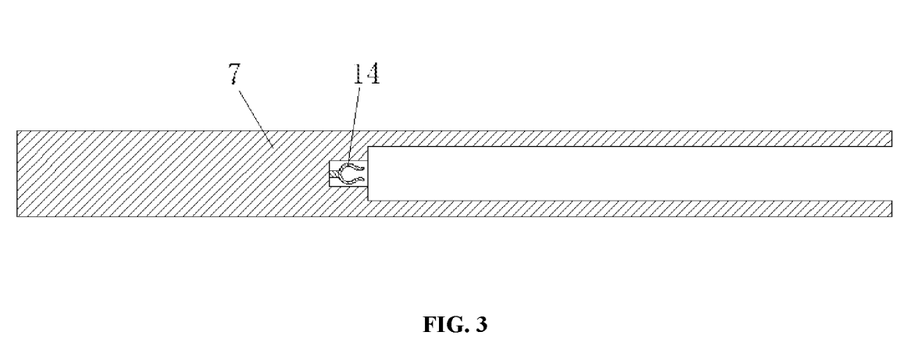
FIG. 3 is a structural sectional view of a supporting beam in the present disclosure.

When the vessel body 1 is unused, the guide rod 6 needs to be adjusted in a horizontal state to pick up the vessel body 1, and then the vessel body 1 is put on the shore or transported. Referring to FIG. 3, an axial direction of the guide rod 6 is provided with a drawing hole. A limiting rod 5 is slidably plugged into the drawing hole. Both ends of the limiting rod 5 respectively extend to outer parts of two ends of the axial direction of the guide rod 6. A side wall of one side in the rectangular notch away from the bow is provided with a storage groove for storing an end of the limiting rod 5. The torsion spring generates torsional potential energy when the guide rod 6 is overturned to a horizontal state around the rotating part. At the same time, the limiting rod 5 slides along the drawing hole, and the end of the limiting rod 5 is inserted into the storage groove, so that the guide rod 6 is prevented from being placed stably after the vessel body 1 is picked up.

A ball-shaped block 16 is fixed at one end of the limiting rod 5, A clamping seat 14 clamped with the ball-shaped block 16 is fixedly arranged in the storage groove. After the end of the limiting rod 5 is inserted into the storage groove, the ball-shaped block 16 is stuck on the clamping seat 14, so the limiting rod 5 is prevented from being randomly drawn along the drawing hole to cause that the guide rod 6 is randomly deflected.

Figure 4:
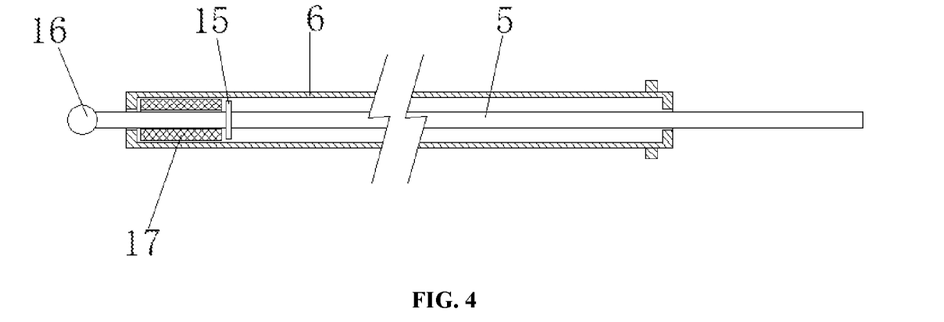
FIG. 4 is the local section view of a guide rod in the present disclosure.

Referring to FIG. 4, a counterweight column 17 is slidably plugged into the drawing hole. An axial direction of the counterweight column 17 is provided with a through hole which is slidably plugged by the limiting rod 5. An outer wall of the limiting rod 5 is fixedly sleeved with a limiting disc 15 which is located in the drawing hole. When the vessel body 1 encounters wind and waves, the vessel body 1 is shaken. The counterweight column 17 is arranged in the drawing hole, and the limiting disc 15 for limiting the counterweight column 17 from sliding randomly is arranged, so that a bottom end of the guide rod 6 is heavy and cannot swing randomly, and the stability of the vessel body 1 is enhanced.

Referring to FIG. 1, drainage plate 3 is fixed on a side wall of one side in the discharge space of the vessel body 1 close to the bow. An upper end surface of drainage plate 3 is obliquely distributed above a stern side near the vessel body 1. During the advancing process of the vessel body 1, after the water flow rushes to the upper-end surface of the vessel body 1, the bow 1 of the vessel body 1 is tilted upwards through the obstruction of the baffle plate 2, and the water impacting on the vessel body 1 flows along the inclined upper end surface of the drainage plate 3, so that the flowing time of the water flow is prolonged. During the flowing process, the vessel body 1 can be weighted to avoid the bow from being tilted upwards too much to cause overturning.

In addition, a plurality of diversion plates 4 are fixed on side walls of both sides of drainage plate 3. Side walls of both sides of the diversion plate 4 are bent upward by 90 degrees to form a splitting channel. The water flow flows from the upper end surface of the drainage plate 3 into the diversion groove of the diversion plate 4, and finally flows out through the diversion groove. In this process, the residence time of the water flow can be further prolonged, the weight of the vessel body 1 is achieved, and the stability of the vessel body 1 is enhanced.

Figure 7:
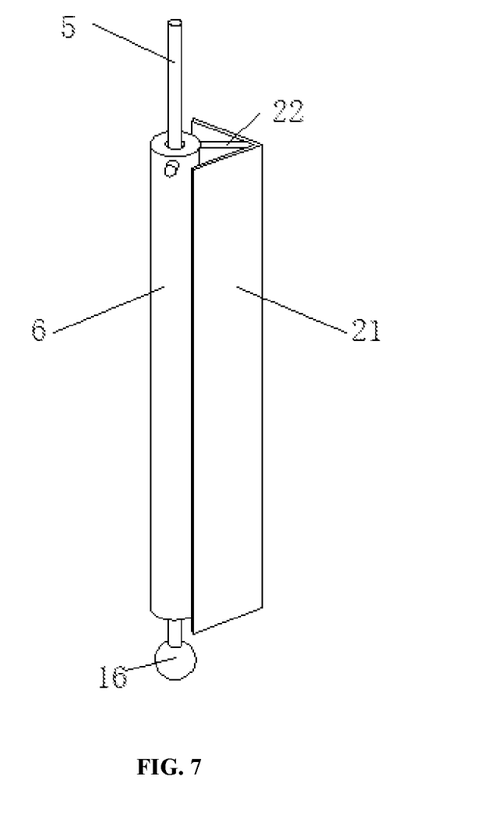
FIG. 7 is a structural schematic diagram of a guide rod in the present disclosure.

Referring to FIG. 7, a guide plate 21 with a V-shaped structure is fixedly arranged on a side wall of one side, close to the advancing direction of the bow, on an outer wall of the guide rod 6 through a supporting block 22. The guide rod 6 is vertically distributed. When impact of the water flow is encountered, through the diversion of the V-shaped guide plate 21, the resistance of the guide rod 6 in the advancing process is reduced.

Although the embodiments of the present disclosure have already been illustrated and described, various changes, modifications, replacements and transformations can be made by those skilled in the art under the condition of without departing from the principle and the spirit of the present disclosure and thus the scope of the present disclosure should be restricted by claims and equivalents thereof.

What is claimed is:

1. An unmanned survey vessel with an anti-overturning structure, comprising a vessel body (1) and a plurality of buoys (9), a tail part of the vessel body (1) being provided with a powered propeller for advancing the vessel body (1), wherein the vessel body (1) is a hollow frame of which a middle is provided with a discharge space, a bottom of a bow of the vessel body (1) is provided with a baffle plate (2) distributed in a V-shaped structure, and the baffle plate (2) is obliquely distributed towards a side of tail direction below the vessel body (1);

an upright rod (8) is vertically fixed at an upper end of the tail part of the vessel body (1), a supporting beam (7) is horizontally fixed at an upper end of the upright rod (8), the supporting beam (7) extends to the bow of the vessel body (1), a rectangular notch is formed in one end, close to the bow, of the supporting beam (7), a guide rod (6) is rotatably provided, through a pin shaft, at one end in the rectangular notch close to the bow, a torsion spring is arranged at a rotating part, and the guide rod (6) is overturned around the pin shaft with a trend of real-time vertical downward distribution by means of torsion potential energy of the torsion spring; and the plurality of buoys (9) are equally divided into two groups which are adjustably arranged on two side walls of the vessel body (1) in an advancing direction of the vessel body (1) respectively.

2. The unmanned survey vessel with an anti-overturning structure, according to claim 1, wherein a drawing hole is axially formed in the guide rod (6), a limiting rod (5) is slidably plugged into the drawing hole, both ends of the limiting rod (5) respectively extend to outer parts of two axial ends of the guide rod (6), and a storage groove for storing an end of the limiting rod (5) is formed in a side wall of one side, away from the bow, in the rectangular notch.

3. The unmanned survey vessel with an anti-overturning structure according to claim 2, wherein a ball-shaped block (16) is fixed at one end of the limiting rod (5), and a clamping seat (14) clamped with the ball-shaped block (16) is fixedly arranged in the storage groove.

4. The unmanned survey vessel with an anti-overturning structure according to claim 2, wherein a counterweight column (17) is slidably plugged into the drawing hole, a through hole into which the limiting rod (5) is slidably plugged is axially formed in the counterweight column (17), and an outer wall of the limiting rod (5) is fixedly sleeved with a limiting disc (15) which is located in the drawing hole.

5. The unmanned survey vessel with an anti-overturning structure according to claim 1, wherein an axial end of each buoy (9) is provided with a connecting block, an adjusting rod (10) is fixedly arranged at an end of the connecting block, a toothed disc (11) is fixed on a side wall of one end, away from the connecting block, of the adjusting rod (10) through a connecting rod, each of side walls of both sides of the vessel body (1) in the advancing direction is provided with a plurality of toothed slots (18), and the toothed discs (11) are meshed with the toothed slots (18); and an adjusting cavity (19) communicating with each toothed slot (18) is arranged in the vessel body (1), limiting grooves (20) are formed on both sides in the adjusting cavity (19), one end, away from the connecting rod, of the toothed disc (11) is rotatably connected with a T-shaped rod (13) located in the adjusting cavity (19), two arc-shaped elastic sheets (12) are symmetrically fixed at one end, away from the toothed disc (11), of the T-shaped rod (13), and one end of each arc-shaped elastic sheet (12) extends into the limiting groove (20) and is slidably attached to an inner wall of the limiting groove (20).

6. The unmanned survey vessel with an anti-overturning structure according to claim 5, wherein each buoy (9) is rotatably connected with the connecting block.

7. The unmanned survey vessel with an anti-overturning structure according to claim 1, wherein a diversion plate (3) is fixed on a side wall of one side close to the bow in the discharge space of the vessel body (1), and an upper-end surface of the diversion plate (3) is Obliquely distributed towards a side, close to the vessel body (1), of the tail part above the vessel body (1).

8. The unmanned survey vessel with an anti-overturning structure according to claim 7, wherein a plurality of splitter plates (4) are fixed on side walls of both sides of the diversion plate (3), and side walls of both sides of each splitter plate (4) are bent upward by 90 degrees to form a splitting channel.

9. The unmanned survey vessel with an anti-overturning structure according to claim 1, wherein a guide plate (21) with a V-shaped structure is fixedly arranged on a side wall of one side, close to the advancing direction of the bow, on an outer wall of the guide rod (6) through a supporting block (22).

10. An anti-overturning method of an unmanned survey vessel with an anti-overturning structure, adopting the unmanned survey vessel with an anti-overturning structure according to claim 1, comprising the following steps:
stably buoying the vessel body (1) with a plurality of buoys (9) so that the vessel body (1) runs on a water surface;
erecting the supporting beam (7) through the upright rod (8) so as to prevent water waves from wetting a measuring instrument and ensure normal use of the measuring instrument; and
setting the vessel body (1) as a hollow frame of which a middle is provided with a discharge space, so that the water waves hit the vessel body (1) and then fall into the discharge space when the vessel body (1) encounters strong winds and water waves, and simultaneously an impact surface with the vessel body (1) is decreased, so that a wave resistance and an overturning resistance are enhanced.

* * * * *